April 13, 1965 J. B. LINKER, JR., ETAL 3,178,654

AUTOMATIC FREQUENCY CONTROL SYSTEM HAVING AN ELECTRICALLY TUNABLE RESONANT CIRCUIT AS A FREQUENCY REFERENCE ELEMENT

Filed Nov. 29, 1961 2 Sheets-Sheet 1

INVENTORS:
JOE B. LINKER, JR.
AZATOLLAH FAROKHROOZ,

BY I David Blumenfeld
THEIR ATTORNEY.

April 13, 1965 J. B. LINKER, JR., ETAL 3,178,654

AUTOMATIC FREQUENCY CONTROL SYSTEM HAVING AN ELECTRICALLY TUNABLE RESONANT CIRCUIT AS A FREQUENCY REFERENCE ELEMENT

Filed Nov. 29, 1961 2 Sheets-Sheet 2

INVENTORS:
JOE B. LINKER, JR.
AZATOLLAH FAROKHROOZ,
BY I. David Blumenfeld
THEIR ATTORNEY.

United States Patent Office 3,178,654

Patented Apr. 13, 1965

3,178,654

AUTOMATIC FREQUENCY CONTROL SYSTEM HAVING AN ELECTRICALLY TUNABLE RESONANT CIRCUIT AS A FREQUENCY REFERENCE ELEMENT

Joe B. Linker, Jr., and Azatollah Farokhrooz, Lynchburg, Va., assignors to General Electric Company, a corporation of New York Filed Nov. 29, 1961, Ser. No. 155,652
4 Claims. (Cl. 331—6)

Figure 1:
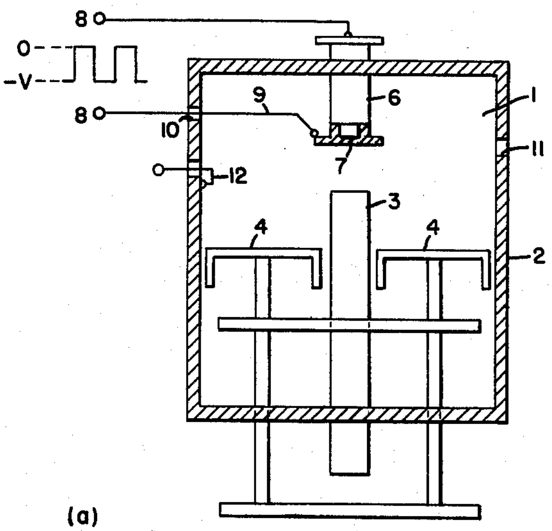

This invention relates to an automatic frequency control (AFC) system. More particularly, this invention relates to a frequency control circuit which utilizes a novel, electrically tunable, resonant circuit as a frequency reference element.

Some AFC circuits for microwave oscillators have incorporated high Q resonant cavities as frequency reference elements. In such circuits, the cavity utilized a pair of detecting elements to sample the oscillator output and produce an error signal which is a function of the frequency drift of the oscillator. The so-called "Pound" R.F. discriminator illustrated and described on pp. 58–69 of Techniques of Microwave Measurements, Montgomery, McGraw & Hill, Inc., New York and London (1947) is typical of such an arrangement.

A two crystal type of A.F.C. circuit, however, requires the use of matched detecting elements; a requirement which is very difficult to meet initially and even more difficult to maintain under varying conditions such as temperature, age, power level, etc. Even if matched detectors are initially provided, changes in temperature, aging effects, power level, etc., do not produce identical changes in the detector characteristics so that errors are introduced which seriously limit the accuracy and utility of such frequency control circuits.

In an attempt to overcome these limitations, automatic frequency control systems have been developed which utilize a reference cavity the resonant frequency of which is cyclically varied or "wobbulated" so that only a single detector element is required. Frequency "wobbulation" of the cavity can be achieved by means of electromechanical devices, such as vibrating membranes, or the like, which are used to vary the cavity dimensions at some predetermined rate. This approach is far from ideal, however, since a system which is based on physically varying the dimensions of the cavity is cumbersome, clumsy, complex, and often has a limited life.

It is, therefore, an object of this invention to provide a variable frequency resonant cavity wherein the variations of the resonant frequency are achieved electrically by means of a simple, compact, semi-conductor device which introduces an electrically variable reactance into the cavity.

By incorporating this novel resonant cavity element in an automatic frequency control system, the resonant frequency of the cavity may be periodically switched ("wobbulated") between two discrete values. Any drift of the oscillator frequency results in a square wave amplitude modulation of the signal which appears at the output of the cavity. The magnitude and phase of the envelope of the modulated signal when detected as a square wave is a function of the amount and the direction of the shift of the oscillator frequency from the desired frequency, hereinafter referred to as $f_0$. The modulated signal from the cavity as detected produces an error voltage which controls the microwave oscillator supply voltage to maintain the frequency of the microwave oscillator output at the proper value, $f_0$.

It is, therefore, a further object of this invention to provide a novel, automatic frequency control system for microwave frequency oscillators which utilizes a novel cavity element with variable resonant frequencies which may be varied discretely between two values;

Another object of this invention is to provide a new and novel automatic frequency control system useful in connection with microwave frequency oscillators of the voltage tunable type;

Still another object of this invention is to provide a variable frequency resonant cavity which may be electrically tuned, is of simple construction, and may be easily manufactured;

Other objects and advantages of the instant invention will become apparent as the description thereof proceeds.

The various objects and advantages described above may be achieved, in one form of the invention, by utilizing a resonant cavity which includes an electrically variable capacitor. The variable capacitor is a semiconductor diode device, usually referred to as a "varactor," which exhibits a capacitance that varies as a function of the voltage applied across the diode. By applying a square wave or other periodic modulating voltages to the diode, the resonant frequency of the cavity is varied between limits determined by this voltage-capacitance relationship of the diode.

The electrically variable resonant cavity is incorporated in an automatic frequency control (AFC) system which includes a variable frequency square wave oscillator, rectifying and filtering means coupled to a voltage sensitive microwave frequency generator to provide, for example, the operating potential to the reflector electrode of a reflex klystron. The output from the square wave oscillator is also used to vary the bias of a "varactor" diode positioned in a frequency reference cavity forming part of the AFC loop. By thus "wobbulating" the resonant frequency of the cavity between two discrete values, the output from the cavity is amplitude modulated whenever the klystron frequency departs from the desired value $f_0$. The now amplitude modulated output signal from the cavity is amplitude detected to obtain an error signal, the amplitude of which is proportional to the frequency shift and the polarity of which is representative of the direction of the klystron frequency change. The error signal acts to control the square wave oscillator which is used to generate the repeller voltage for the klystron. Hence the magnitude of the energizing voltage applied to the klystron repeller is controlled so that the klystron output signal is maintained at the proper frequency $f_0$.

Figure 5:
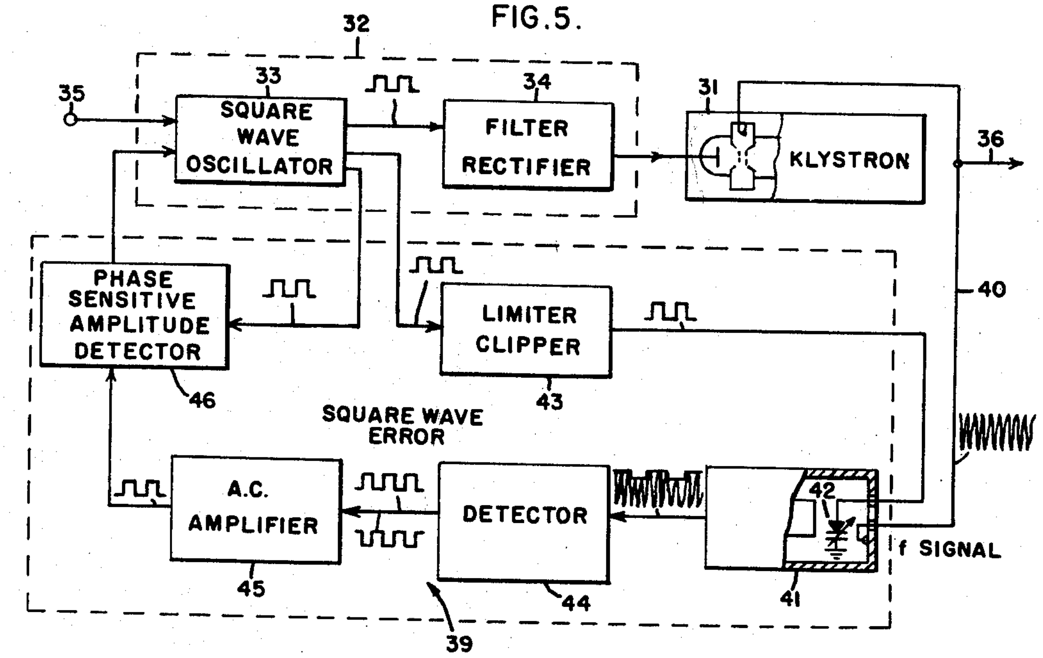

The novel features which are characteristic of this invention are set forth with particularity in the appended claims. The invention itself, however, both as to its organization and method of operation, together with other objects and advantages thereof, may best be understood by reference to the following description taken in connection with the accompanying drawings in which:

FIG. 1 is a cross-sectional view of one version of the novel variable frequency resonant cavity of the invention;

FIGS. 2*a* and 2*b*, 3*a* and 3*b*, 4*a* and 4*b*, are graphical representations of the operating characteristics of the resonant cavity and are useful in understanding the operation thereof;

FIG. 5 is an illustration, in block diagram form, of a novel automatic frequency control system utilizing the variable frequency resonant cavity of FIG. 1.

FIG. 1 illustrates one embodiment of a variable frequency resonant cavity constructed in accordance with the invention. The resonant cavity is of the distributed parameter coaxial type and includes an outer envelope or shell 2, a reentrant coaxial member 3 positionable within the cavity and a movable tuning plunger 4 for initially adjusting the resonant frequency of the cavity. This cavity is a reentrant cavity, which approximates a coaxial line, shorted at one end and open at the other.

The resonant frequency is a function of the distributed L and C parameters, which are largely dependent on the dimensions of the cavity, and the lumped capacitance existing between the bottom and top surfaces of the cavity as well as the reentrant member. The resonant frequency is "wobbulated" by means of an electrically variable reactance element 6 mounted in the upper wall of the cavity. Element 6 is a semiconductor device such as a P-N junction diode. A conductive cap 7 is connected to one electrode of the diode. Bias voltage is supplied from terminal 8 which is connected to cap 7 by a lead 9 passing through opening 10 in the cavity. The other bias voltage terminal 8 is connected through another lead to the remaining electrode of the diode. The latter electrode can conveniently be grounded to the outer shell of the cavity. The biasing voltage, the wave form of which is illustrated schematically in FIG. 1, varies stepwise between a reference level such as ground or zero volts, and value of negative voltage —V, thereby switching the capacitance of diode 6 between two discrete values. The resonant frequency of the cavity, therefore, in accordance with such reactance change as is thus projected into the cavity, varies between two discrete values $f_1$ and $f_2$ with the applied bias.

The voltage sensitive variable capacitance 6 is a zero or reverse biased PN junction diode. With such biasing, a narrow region free of all mobile charge carriers exists at the junction of the P and N type conductivity materials. This charge free region, which is usually referred to as the "depletion" layer, is bounded on either side by P and N conductivity material. The diode is, therefore, a charge free or "dielectric" region bounded by two semiconducting regions. This, by definition, is a capacitor. The width of the "depletion" layer at the junction is varied by varying the voltage across the diode thereby electrically varying the capacitance of the diode.

Figure 2:
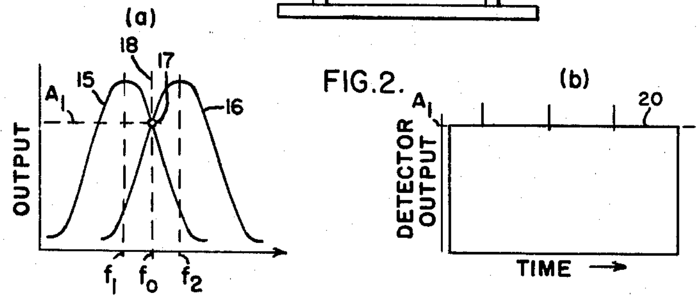
Figure 3:
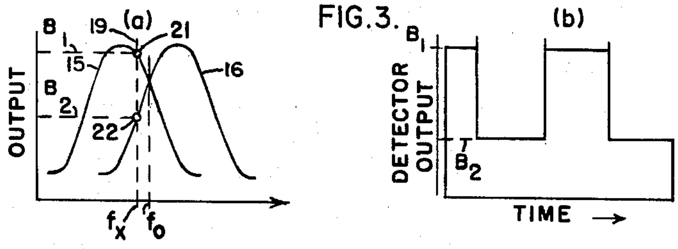
Figure 4:
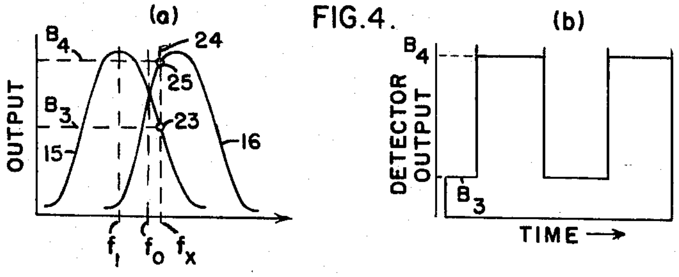

A microwave frequency signal is introduced into cavity 13 by means of an input coupling iris 11 (or alternatively a coupling loop) and is abstracted from the cavity by means of an output coupling loop 12 (or alternatively a coupling iris). As the resonant frequency of the cavity is varied discretely between $f_1$ and $f_2$, by the application of square wave biasing to diode element 6, the microwave signal transmitted through the cavity is amplitude modulated by an amount depending on the frequency displacement of the incoming microwave frequency signal from a desired predetermined frequency $f_0$. The manner in which this amplitude modulation takes place may be most easily understood by reference to FIGS. 2, 3 and 4. FIGS. 2*a*, 3*a*, and 4*a* represent the operating characteristics of the resonant cavity, i.e., the shape and position of the resonance curve, as the applied square wave bias shifts the resonant frequency discretely between $f_1$ and $f_2$. FIGS. 2*b*, 3*b* and 4*b* illustrate the variations in the amplitude of the detected output signal from the cavity as the input signal frequency is changed from $f_0$ in either direction.

FIG. 2*a* illustrates graphically the characteristic responses (output versus frequency) of a "wobbulated" resonant cavity with the output, in comparative terms, plotted along the ordinate and the frequency $f$ along the abscissa. With zero biasing volts on diode 6, the resonant frequency of the cavity is $f_1$, and the output versus frequency characteristic of the cavity is represented by resonance curve 15. With the negative biasing voltage—V impressed on diode 6, the capacity of the diode decreases. The resonant frequency of the cavity increases to $f_2$ and the output versus frequency characteristic of the cavity is represented by the resonance curve 16. The cavity resonant frequencies $f_1$ and $f_2$ are respectively lower and higher than the desired oscillator frequency $f_0$ with the desired frequency $f_0$ at crossover point 17 of resonant curves 15 and 16.

If the input signal is at the desired frequency $f_0$, the cavity output is constant for both discrete values of cavity resonance $f_1$ and $f_2$. With cavity resonance at $f_1$, the output amplitude of a signal of frequency $f_0$ is the intersection 17 of the dashed line 18 (frequency $f_0$) with the resonance curve 15. With the resonant frequency of the cavity shifted to $f_2$ by application of —V to diode 6, the output amplitude of the signal is determined by the intersection of dashed line 18 (frequency $f_0$) with curve 16. As may be seen, the output signal amplitude is a constant value $A_1$ and there is no square wave amplitude modulation of the microwave signal from the cavity as the cavity resonance is periodically shifted or "wobbulated." The detected cavity output is, therefore, represented by line 20 of curve 2*b*. The spikes represent the detected output amplitude as the cavity response is shifted from 15 to 16 (from $f_1$ to $f_2$) and back by a square wave of finite though small rise time and fall time.

With an input frequency $f_x$, as represented by the dashed line 19 of FIG. 3*a*, where $f_x$ is less than $f_0$, the magnitude of the output signal when the cavity resonant frequency is at $f_1$, is represented by $B_1$, the intersection 21 of line 19 (frequency $f_x$) with curve 15. When the resonant frequency of the cavity is switched to $f_2$ by the application of the negative voltage —V, the amplitude of the output signal is represented by $B_2$, the intersection of line 19 (frequency $f_x$) with resonance curve 16. The output signal from cavity 1 is thus amplitude modulated with a square wave and the output of a detector connected to loop 12 would produce a square wave output such as is illustrated in FIG. 3*b*. As the frequency $f_x$ shifts further from the desired frequency $f_0$ in one direction, the amplitude of the detected square wave increases to a maximum and then decreases as the frequency shift increases further. The magnitude of the square wave is proportional to the difference in amplitude of the two curves 15 and 16 at any frequency $f_x$. Conversely, as the input frequency approaches the desired frequency $f_0$, the amplitude of the detected square wave is reduced and approaches zero as the frequency difference $\Delta f$ between $f_0$ and $f_x$ approaches zero, i.e., as $f_x$ approaches $f_0$.

If the incoming frequency $f_x$ is greater than the desired frequency $f_0$, the cavity output signal is also amplitude modulated, but the polarity of the detected modulation is opposite from what it is when $f_x$ is less than $f_0$. This may be most easily understood by reference to FIGS. 4*a* and 4*b*. When the cavity resonant frequency is $f_1$ (curve 15), the output signal amplitude $B_3$ is determined by the intersection 23 of line 24 (frequency) and curve 15. As the resonant frequency of cavity 13 is switched to $f_2$, the output signal amplitude $B_4$ is established by the intersection 25 of line 24 (frequency) and curve 16. As the cavity resonant frequency is switched back and forth ("wobbulated") between $f_1$ and $f_2$, the output signal is again amplitude modulated with a square wave as illustrated in FIG. 4*b*. The square wave modulation with $f_x$ greater than $f_0$ is, when compared with FIG. 3*b*, of opposite polarity. The amplitude of the detected square wave modulation is again a function of the difference between $f_x$ and the desired frequency $f_0$. It is now apparent that an electrically tunable reference cavity device has been invented whose resonant frequency may be easily switched to either of two discrete values.

For the sake of simplicity of explanation, the "wobbulated" cavity of FIG. 1 has been described with characteristics which are symmetrical. That is, the resonance curves of the cavity for $f_1$ and $f_2$ are identical and $f_1$ and $f_2$ are symmetrically positioned with respect to $f_0$. While such an arrangement is preferred, the invention is not limited to this type of operation since the desired result will be obtained in the absence of such symmetry as long as the cavity resonance curves have resonant frequencies $f_1$ and $f_2$ which bracket $f_0$ and so long as they have sufficient amplitudes to show a crossover point at the desired frequency $f_0$. The shape and symmetry of the curves are not of prime significance. It will also be obvious that the present invention is not limited to reentrant cavities of the coaxial type such as shown in FIG.

1. Any other type of resonant cavity such as cylindrical, rectangular, etc., may be used with equal facility in practicing the invention.

FIG. 5 illustrates, in block diagram form, one embodiment of a novel frequency control system utilizing an electronically variable reference cavity of the type described in connection with FIGS. 1–4. The automatic frequency control circuit arrangement includes a microwave oscillator 31, the frequency of which may be varied by a suitable control voltage. There are a number of microwave frequency generating devices which may be controlled in this manner. Velocity modulated electron beam types, such as klystrons, voltage tunable magnetrons, and travelling wave tubes are typical of this class of microwave devices. Although any one of these voltage sensitive variable frequency microwave oscillators may be utilized, the oscillator shown in block diagram form in FIG. 5 is a reflex klystron. Coupled to klystron oscillator 31 is a variable unidirectional voltage source 32, which controls the klystron repeller voltage and hence the output frequency of the oscillator. This voltage supply includes a variable frequency square wave oscillator 33 used in a chopper application and a filter-rectifier combination 34.

Oscillator 33 is essentially a D.-C. to A.-C. converter which operates from a preregulated unidirectional input supply voltage impressed on an input terminal 35. Square wave oscillator 33 is preferably of the type utilizing a pair of switching transistors and a saturable reactor element. The frequency of the square wave oscillator is determined by the time necessary for the saturable reactor associated with the transistor switches to change from saturation in one direction to saturation in the other direction. Since the volt-second characteristic of the cone material of the saturable reactor establishes the time necessary for saturation to occur, and that in turn is dependent on the applied voltage, it can be seen that the frequency of the oscillator may be varied by varying the D.-C. voltage applied to the circuit.

Oscillators of this type are very well known in the art and no further description thereof is needed. For a detailed description of such a variable frequency voltage sensitive oscillator, reference is hereby made to Patent No. 2,783,384, Bright et al., issued February 26, 1957, as well as the Chapter 22, "Transistor Saturable Reactor Circuits," pp. 443–454 of Junction Transistor Electronics, R. B. Hurley, John Wiley & Sons, Inc., New York (1958). Although transistorized square wave oscillators such as the one described in the Bright patent and in the textbook cited above, are preferred, it will be obvious that tube inverter circuits or any other voltage sensitive square wave oscillator may be used in the frequency control oscillator system arrangement of FIG. 4.

The square wave output from oscillator 33 is applied to the filter and rectifier combination 34 to produce a unidirectional reflector voltage, the average value of which is proportional to the square wave repetition frequency. The variable D.-C. voltage is applied to the reflector electrode of a klystron oscillator 31 to control the output frequency of the oscillator. The output of klystron oscillator 31, which is in the microwave frequency range, and may be in the order of 6,000 mc., for example, is applied to a suitable output transmission line 36 connected to an antenna or other preferred suitable circuitry.

A portion of the output signal from the klystron is also applied to an automatic frequency control circuit shown generally at 39, which produces an error signal in response to shift of the klystron output frequency from a desired frequency $f_0$. This error signal is in turn utilized to control the output frequency of square wave oscillator 33 to vary the unidirectional voltage applied to the klystron repeller in such a manner that the output frequency is maintained at the desired frequency $f_0$. To this end, a portion of the output signal from the klystron is applied over line 40 to an electronically variable cavity element 41 which includes a voltage variable reactance element 42 of the type described in connection with the cavity structure illustrated in FIG. 1. Cavity 41, as was discussed previously, has its resonance frequency "wobbulated" by the periodic application of a square wave biasing voltage which varies the capacitance of varactor 42 between two values and correspondingly shifts the resonant frequency of the cavity between two frequencies $f_1$ and $f_2$ lying on either side of the desired frequency $f_0$. The square wave biasing voltage for "varactor" 42 is supplied from the square wave oscillator 33 thereby periodically shifting ("wobbulating") the resonant frequency of the cavity at the square wave oscillator frequency. The output from oscillator 33 is applied to a limiter-clipper 43 so that the square wave applied to "varactor" 42 is always of a predetermined amplitude so that the capacitance of "varactor" 43 is shifted between two accurate values, even with amplitude variation in the output of oscillator 33.

As had been discussed previously, the output from cavity 41 is amplitude modulated with a square wave whenever the frequency of the klystron shifts from the desired value $f_0$. The amplitude of the square wave modulation is a function of the magnitude of the frequency shift and the direction of the frequency shift. It is amplitude detector 44, coupled to cavity 41, which detects the signal modulation and produces a square wave error signal. The square wave error signal is applied to an alternating current amplifier 45 and the amplified signal is impressed on one input terminal of a phase sensitive amplitude detector 46. A reference square wave signal from oscillator 33 is also impressed on phase sensitive detector 46. The output of detector 46 is, therefore, a varying unidirectional control signal the magnitude and polarity of which are respectively proportional to the relative amplitudes and polarity of the error and reference signals.

The varying unidirectional control signal from phase sensitive amplitude detector 46 is applied to square wave oscillator 33 to vary its frequency in the proper direction to maintain the klystron repeller voltage at the proper level, thus maintaining the klystron frequency at $f_0$. That is, the varying unidirectional voltage from the phase detector either adds or subtracts from the square wave oscillator supply voltage impressed on input terminal 35, thereby varying the output frequency of oscillator 33. The average unidirectional potential at the output of filter-rectifier 34 is thus varied in response to the control signal produced by the A.F.C. loop to maintain the klystron output frequency at the proper value $f_0$.

In the event that the klystron frequency is at the correct value $f_0$, it is apparent that the output signal from reference cavity 41 contains no amplitude modulation. As a result, there is no square wave error signal at the output of amplifier 45 and no error signal input to phase sensitive detector 46. The unidirectional control voltage from this phase detector drops to zero and the square wave oscillator output frequency is unchanged.

By using an electrically variable reference cavity element, such as the one described above, the circuitry of the automatic frequency control system is greatly simplified, since the resonant frequency of cavity 41 may now be switched between two *discrete* values. The output signal from the cavity is, therefore, amplitude modulated *only if* the klystron frequency deviates from the desired frequency. In prior art systems (electromechanical, for instance) wherein the cavity frequency is continuously varied through a range of values between $f_1$ and $f_2$ in simple harmonic motion, the output from the "wobbulated" cavity is amplitude modulated at twice the wobbulating frequency even if the oscillator frequency is at the desired frequency $f_0$. It is, therefore, necessary to use filtering elements to filter out this 2nd harmonic of the modulating signal. In the automatic frequency control arrangement illustrated in FIG. 5, no such filtering is necessary since, as discussed previously, there is no amplitude modulation of the output signal when the klystron output is at the desired frequency. It is apparent that this reduces the size, complexity and cost of the system.

The automatic frequency control system described above will function in the desired manner if the microwave oscillator is continuous wave (C.W.), frequency or phase modulated (F.M.), or amplitude modulated.

It is obvious, therefore, that a novel electrically variable resonant cavity element has been described which is simple in construction and readily variable between two discrete values of resonant frequencies. Furthermore, a novel, accurate, and relatively simple automatic frequency control system has been disclosed which utilizes this electrically variable reference cavity to great advantage.

While particular embodiments of this invention have been shown and described above, it will, of course, be understood that the invention is not limited thereto since many other modifications both in the circuit arrangement and in the instrumentalities employed may be made. It is contemplated by the appended claims to cover any such modifications which fall within the true spirit, basic principles, and scope of this invention.

What is claimed as new and desired to be secured by Letters Patent is:

1. An automatic frequency control system comprising,
(*a*) a voltage sensitive oscillator,
(*b*) a variable voltage source coupled to said oscillator, said source providing operating voltage for and controlling the frequency of said oscillator,
(*c*) a variable electrically tunable resonant frequency reference element,
(*d*) means to apply a portion of the oscillator output to said reference element,
(*e*) modulating means for abruptly shifting the resonant frequency of said reference element in response to a modulating signal between two discrete values above and below the desired oscillator frequency without shifting the frequency to any intermediate values to amplitude modulate the applied oscillator signal in response to departures from the desired frequency,
(*f*) means to produce a control signal by comparing said modulated oscillator signal with a signal related in phase to said modulating signal,
(*g*) means to vary voltage output of said voltage source in response to said control signal to correct the frequency departure of said oscillator from the desired value.

2. An automatic frequency control system comprising,
(*a*) a voltage sensitive oscillator,
(*b*) a variable voltage source coupled to said oscillator, said source providing operating voltage for and controlling the frequency of said oscillator,
(*c*) said variable source including a variable frequency oscillator the frequency of which controls the amplitude of the supply voltage,
(*d*) a variable electrically tunable resonant frequency reference element,
(*e*) means to apply a portion of the output from said voltage sensitive oscillator to said reference element,
(*f*) means for varying the resonant frequency of said reference element between two discrete values at the frequency of said variable frequency source to amplitude modulate the applied signal in response to departures from the desired frequency the relative polarity of said amplitude modulation being a function of the direction of the departure from the desired frequency and the degree of modulation a function of the magnitude of the frequency departure,
(*g*) means to produce a control signal from said amplitude modulated signal the polarity of said control signal varying with the relative polarity of said modulation and its amplitude with the said degree of modulation, and including means to compare the amplitude modulation of said signal with a reference signal derived from the means for varying the resonant frequency of the reference element, and
(*h*) means to vary the frequency of the variable frequency oscillator and the output of said voltage source in response to said control signal to correct any departures of the voltage sensitive oscillator from the desired frequency.

3. An automatic frequency control system comprising,
(*a*) a voltage sensitive microwave oscillator,
(*b*) a variable voltage source coupled to said oscillator, said source providing operating voltage for and controlling the frequency of said oscillator,
(*c*) said variable source including a variable frequency oscillator the frequency of which controls the amplitude of the supply voltage,
(*d*) an electrically tunable frequency reference element including a cavity and a voltage variable capacitance in said cavity,
(*e*) means to apply a portion of the output signal from said microwave oscillator to said cavity,
(*f*) means to apply the output from said variable frequency oscillator to said capacitance to vary the resonant frequency of said cavity between two values to amplitude modulate the signal applied to the cavity in response to departures from the desired frequency the relative polarity of said amplitude modulation being a function of the direction of the departure from said desired frequency and the degree of modulation a function of the magnitude of the frequency departure,
(*g*) means to produce a control signal from said amplitude modulated signal the polarity of said control signal varying with the relative polarity of said modulation and its amplitude with the said degree of modulation, and including means to compare the amplitude modulation of said signal with a reference signal,
(*h*) means to vary the frequency of the variable frequency oscillator and the output of said voltage source in response to said control signal to correct any departures of the voltage sensitive oscillator from the desired frequency.

4. An automatic frequency control system comprising,
(*a*) a voltage sensitive microwave oscillator,
(*b*) a variable voltage source coupled to said oscillator, said source providing operating voltage for and controlling the frequency of said oscillator,
(*c*) said variable source including a square wave oscillator of variable frequency, the frequency of square wave oscillator controlling the amplitude of the operating voltage,
(*d*) a tunable resonant cavity coupled to and adapted to receive a portion of the signal from said microwave oscillator,
(*e*) means to switch the resonant frequency of said cavity discretely between two values,
(*f*) said last named means including a p-n junction diode the capacitance of which varies as a function of the applied voltage,
(*g*) means to impress a square wave signal from said square wave oscillator to said diode to modulate the signal received by said cavity with a square wave in response to departures from the desired frequency,
(*h*) means to detect and compare the phase of said square wave modulation with a reference wave to produce a control signal as a function of the magnitude and direction of the departure from said desired frequency, and
(*i*) means to vary the frequency of the variable frequency oscillator and the output of said voltage source in response to said control signal to correct any departures of the voltage sensitive oscillator from the desired frequency.

References Cited by the Examiner

UNITED STATES PATENTS

| | | | |
|---|---|---|---|
| 2,462,294 | 2/49 | Thompson | 331—9 |
| 2,686,875 | 8/54 | Grant | 331—9 |
| 2,805,334 | 9/57 | Cayzac | 331—9 X |
| 3,039,064 | 6/62 | Dain et al. | 331—177 X |
| 3,108,239 | 10/63 | Koueiter. | |

ROY LAKE, *Primary Examiner*.

JOHN KOMINSKI, *Examiner*.